United States Patent Office 3,409,654
Patented Nov. 5, 1968

3,409,654
COPPER AND ZINC SALTS OF DICYCLOHEXYL PHOSPHINIC ACID
Jerry Peter Milionis and Frank Joseph Arthen, Jr., Somerset, N.J., assignors to American Cyanamid Company, Stamford, Conn., a corporation of Connecticut
No Drawing. Application Apr. 6, 1964, Ser. No. 357,738, now Patent No. 3,293,208, dated Dec. 20, 1966, which is a continuation-in-part of application Ser. No. 292,721, July 3, 1963. Divided and this application June 7, 1966, Ser. No. 560,976
3 Claims. (Cl. 260—429.9)

ABSTRACT OF THE DISCLOSURE

This invention relates to a compound selected from the group consisting of the copper and zinc salts of dicyclohexyldithiophosphinic acid. The compound finds use in stabilizing polyolefins against the deteriorative action of light and heat.

---

This application is a division of application Ser. No. 357,738, filed Apr. 6, 1964, and now Patent No. 3,293,208; and the latter is a continuation-in-part of application Ser. No. 292,721, and now abandoned, filed July 3, 1963.

This invention relates to the provision of a means of stabilizing polyolefins against the deteriorative action of light and heat. It relates further to certain new salts of dicyclohexyldithiophosphinic acid. More particularly it relates to the copper and zinc salts of dicyclohexylthiophosphinic acid.

It is well known that polyolefinic resins tend to deteriorate upon exposure to light and heat, with consequential loss of tensile strength and flexibility and, in the case of clear resin compositions, the appearance of unwanted color. Attempts to treat this problem have generally involved the incorporation of a UV absorber into the polyolefin, which absorber had the ability to preferentially absorb UV radiation and, thus, in effect, shield the resin itself from the damaging radiation. Attempts to protect the composition against the effects of heat require the addition of a separate heat stabilizer. These have been successful to a great degree but they have their limitations. The most important is the ineffectiveness of either type of additive to "shield" the polyolefins from the deteriorating effects of both heat and light. This difficulty of requiring two additives (especially notable in the case of polyproylene compositions which must be heated to relatively high temperatures during the shaping thereof) has not been overcome heretofore by the incorporation of a single additive. The requirement for two additives instead of only one for over-all stabilization of polyolefins, while it is not intolerable, confers upon the user the inconvenience of having to measure, mix and add two materials instead of merely one.

Previous isolated attempts to uncover single stabilizers which could accomplish the required dual function have met with varying degrees of success and, in general, there is still a need for an improved stabilizer capable of conferring both heat and light stability to polyolefin compositions.

The present invention very satisfactorily fills this need in providing the zinc and copper salts of dicyclohexyldithiophosphinic acid. When these salts are added to polyolefins so that they are present in a concentration of about 0.01% to about 5.0% by weight of the composition, the resulting resin mixtures have highly improved stability to both light and heat as compared with a control having no stabilizer. Moreover, the stabilizer is compatible without imparting substantial color ot the resin at proportions which are effective for the above-named stabilization purposes.

It is surprising that the zinc and copper salts of this invention are effective, since, in contrast thereto, related compounds such as the corresponding ammonium salt or the precursor acid, or analogous aryl substituted compounds, are quite ineffective. A desirable feature of the zinc salt of dicyclohexyldithiophosphinic acid is its excellent heat stability. This thermal stability is especially important in reference to its use in polypropylene since this polymer is normally processed at temperatures of 250° to 280° C. Without adequate stability, the protective agent will not withstand such conditions. It is highly unexpected that the copper salt works at all, since copper compounds are generally expected to break down a polymer rather than stabilize it.

The stabilizers of this invention are readily incorporated into resins to be stabilized by milling and mixing means conventional in the art. While, as stated above, it is not required that two stabilizers be employed to effect the desired stabilization, this is not to say that the stabilizers of this invention cannot be used in conjunction with other stabilizers. Other stabilizers may be desirable when the resins are processed above conventional temperatures. As auxiliary stabilizers there may be named the hindered phenols such as 2,6-di-tert-butyl-4-methylphenol, 2,4,6-tritert-butylphenol, 4,4'-thiobis(6-tert-butyl-m-cresol), 4,4'-methylenebis(2,6-di-tert-butylphenol), 4,4'-methylenebis-(6-tert-butyl-m-cresol) 4,4'-butylidenebis(6-tert-butyl-m-cresol), 2,6-bis(2-hydroxy-3-t-butyl-5-methylbenzyl)-p-cresol, 2,2'-methylenebis(4-ethyl-6-tert-butylphenol), 2,2'-methylene-bis-(4,6-dinonylphenol) and 2,2'-methylenebis-(4-methyl-6-tert-butylphenol); phosphites such as triphenylphosphite, tridecylphosphite and dodecylphenylphosphite; and thiodipropionic acid esters such as dilauryl thiodipropionate. Polyolefins containing a combination of the zinc salt of this invention and the above-named auxiliary stabilizers are able to withstand extreme conditions without showing an adverse change in color, odor or viscosity characteristics. If desired, the resin composition may also contain coloring agents, extenders, plasticizers, solvents, etc.

The zinc and copper salts of this invention are conveniently prepared by reaction of dicyclohexylphosphine with sulfur in the presence of ammonium hydroxide. This is illustrated by the following:

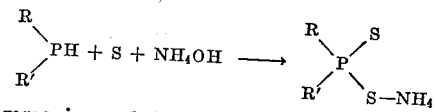

The ammonium salt is then converted to the zinc or copper salt by reaction with a water-soluble zinc or copper salt, respectively.

The invention is further illustrated by the examples which follow.

Example 1.—Zinc dicyclohexyldithiophosphinate

A mixture of 86.5 g. sulfur, 500 ml. of concentrated ammonium hydroxide, 500 ml. water and 400 ml. ethanol is stirred at room temperature while bubbling in helium. To this is added 244 g. of dicyclohexylphosphine dropwise over one hour. An exotherm raises the temperature to 45° C. Stirring is continued 30 minutes after addition without external heating; then the mixture is heated at 65° C. for one hour. It is cooled and filtered and to the filtrate is added 178.6 g. of $ZnSO_4 \cdot 7H_2O$ in 250 cc. water. The white solid which forms is filtered, washed well with water and then acetone. The solid is recrystallized from 1:1 cyclohexane xylene and filtered, giving 180 g. of zinc dicyclohexyldithiophosphinate as a white crystalline product, melting point 215–216° C.

Example 2.—Copper dicyclohexyldithiophosphinate

By following the procedure of Example 1, except for the substitution of copper sulfate for zinc sulfate used therein, the copper dicyclohexyldithiophosphinate is obtained.

Example 3.—Evaluation in polypropylene

Effectiveness in polypropylene was determined by preparation of polypropylene compositions and exposure to ultraviolet light and heat, the time of exposure before development of brittleness being determined. The procedure is described in more detail as follows.

Procedure

Fifty grams of polypropylene powder were placed in a screw-top jar along with the predetermined amount of the compound to be tested. The blend was tumbled for 2 hours. This mixture was placed on a 6″ x 13″ mill whose rolls were heated to 360° F. and 320° F. respectively. This blend was passed through the nip of the rolls, stripped from the rolls and fed endwise into the nip to insure maximum mixing. This operation of stripping and passing through the nip was repeated ten times. From the sheet resulting from this blend, an 18-mill sheet was compression-molded. From this molded sheet, specimens were cut out for the Fade-Ometer test and the forced-draft air oven test.

In the following table of results are shown the hours exposure in the Fade-Ometer and hours exposure in a 140° C. oven to the brittle point.

HOURS EXPOSURE TO REACH BRITTLE POINT (IN POLYPROPYLENE)

| No. | Dithiophosphinate Compound | Percent | Oven Aging 140° C. | Fade-Ometer Exposure |
|---|---|---|---|---|
| 1 | Zinc dicyclohexyl | 0.05 | 260–280 | |
| 2 | do | 0.1 | 380–390 | |
| 3 | do | 0.2 | 639–655 | 600–700 |
| 4 | do | 0.5 | 1,630–1,660 | |
| 5 | Lead dicyclohexyl | 0.2 | 206–216 | 400–500 |
| 6 | Zinc di-n-octyl | 0.2 | 240–260 | 800–900 |
| 7 | Nickel dicyclohexyl | 0.25 | 78 | 1,300 |
| 8 | Cadmium dicyclohexyl | 0.2 | 125–135 | 700–800 |
| 9 | Copper (II) dicyclohexyl | 0.25 | 492 | 500 |
| 10 | Manganese (II) dicyclohexyl | 0.25 | 300 | 500 |
| 11 | Ammonium dicyclohexyl | 0.2 | 36–44 | 300–400 |
| 12 | Ammonium di-n-butyl | 0.2 | 8–20 | 100–200 |
| 13 | Zinc diphenyl | 0.2 | 36–44 | 200–300 |
| 14 | Dicyclohexyl acid | 0.2 | 28–43 | |
| 15 | Control | | 4–6 | 60–100 |

The following claims specify the extremely and unexpectedly active zinc and copper dicyclohexyldithiophosphinates which materials are the preferred members of the group. There are a number of other metal salts which would perform to a significantly lesser extent, but would nevertheless still operate as stabilizers within the over-all concept of our invention. In this regard, it is noted that the lead dicyclohexyl, cadmium dicyclohexyl and manganese dicyclohexyldithiophosphinates perform a stabilizing function while the ammonium and simple alkyl dithiophosphinate compounds are not any better than the controls as shown in the table above.

We claim:
1. A compound selected from the group consisting of the copper and zinc salts of dicyclohexyldithiophosphinic acid.
2. Zinc dicyclohexyldithiophosphinate.
3. Copper dicyclohexyldithiophosphinate.

References Cited

UNITED STATES PATENTS 3,004,996  10/1961  Arakelian _____ 260—429.9
3,168,497   2/1965  Twitchett _____ 260—429.9 X
3,238,248   3/1966  Rauhut _____ 260—429.9 X TOBIAS E. LEVOW, Primary Examiner.

H. M. S. SNEED, Assistant Examiner.